United States Patent [19]

Moore

[11] Patent Number: 4,569,757

[45] Date of Patent: Feb. 11, 1986

[54] ADAPTER SKIRT FOR STATIC AERATOR MIXER

[75] Inventor: Foster L. Moore, Houston, Tex.

[73] Assignee: Champion International Corporation, Stamford, Conn.

[21] Appl. No.: 368,755

[22] Filed: Apr. 15, 1982

Related U.S. Application Data

[63] Continuation of Ser. No. 215,030, Dec. 10, 1980, abandoned.

[51] Int. Cl.⁴ ............................................. C02F 3/26
[52] U.S. Cl. ........................... 210/220; 261/36 R; 261/77; 261/123
[58] Field of Search ................... 261/77, 36 R, 123; 210/170, 198, 220

[56] References Cited

U.S. PATENT DOCUMENTS

| | | | |
|---|---|---|---|
| 459,826 | 9/1891 | Cook | 210/170 X |
| 3,501,133 | 3/1970 | Dreier et al. | 210/220 X |
| 3,628,775 | 12/1971 | McConnell | 210/220 X |
| 3,968,086 | 7/1976 | Romanowski | 261/77 |
| 4,169,873 | 10/1979 | Lipert | 261/77 X |

Primary Examiner—David Sadowski
Attorney, Agent, or Firm—Evelyn M. Sommer; John H. Mulholland; William W. Jones

[57] ABSTRACT

A skirt for a sewage aerator mixer is supported on a bubble generator pipe beneath the mixer structure in a sludge basin or directly on the floor of the basin in surrounding relation to the lower end of the mixer structure to extend the sphere of influence of the mixer.

16 Claims, 17 Drawing Figures

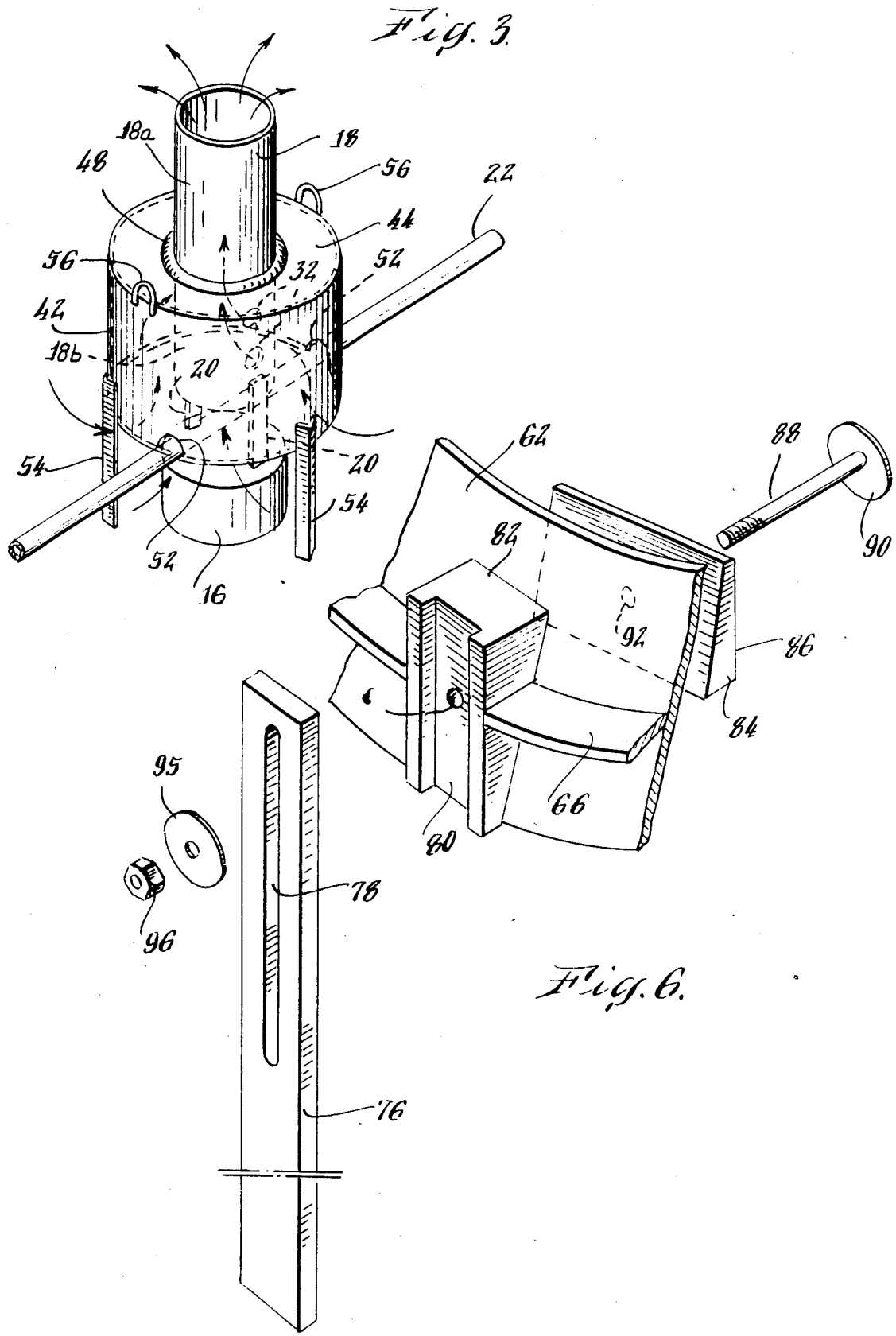

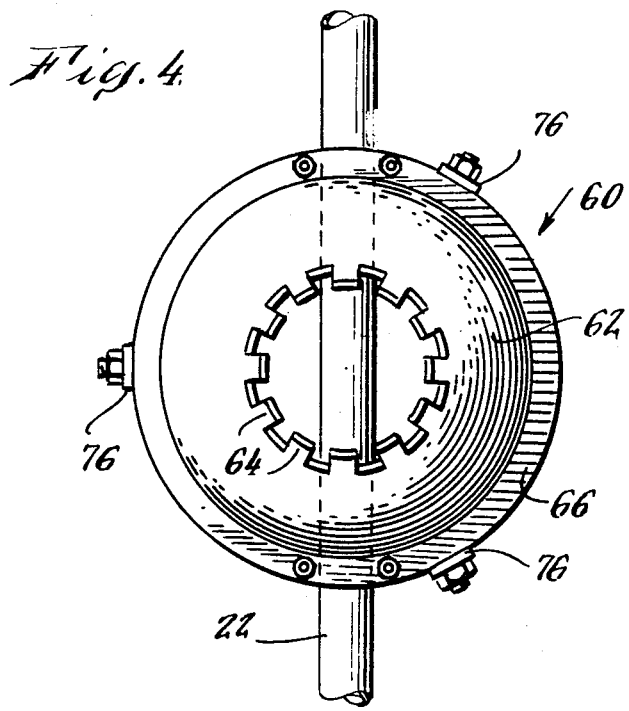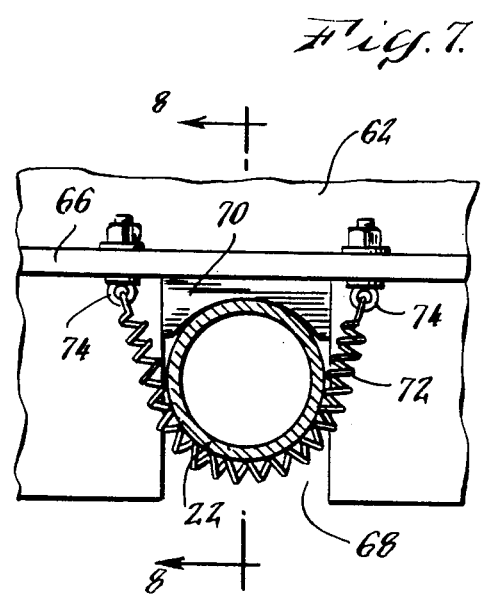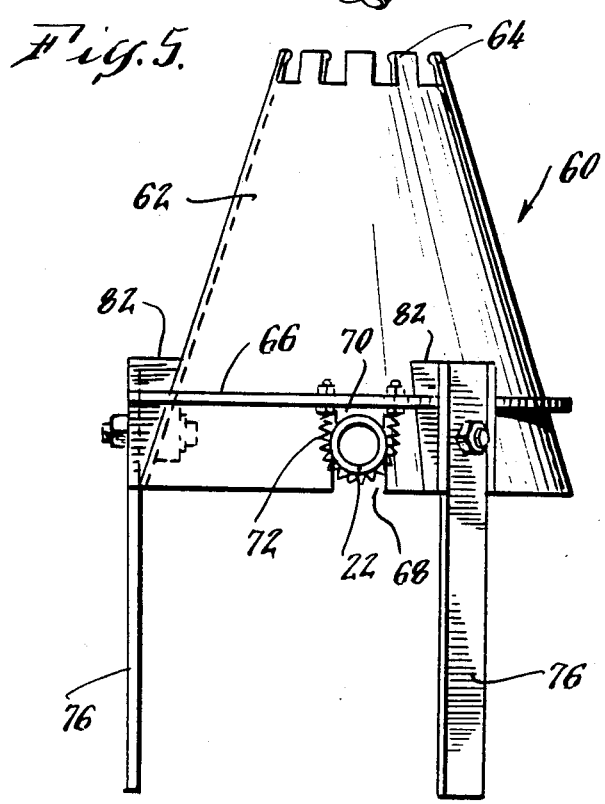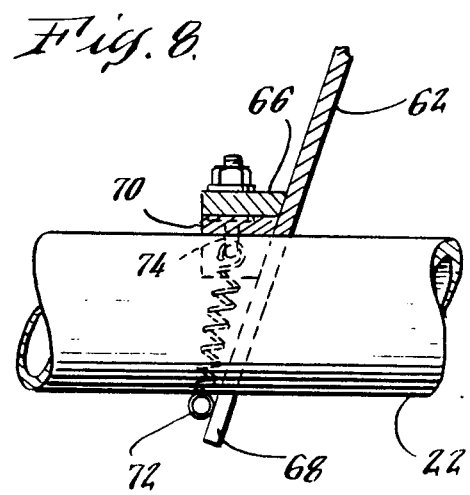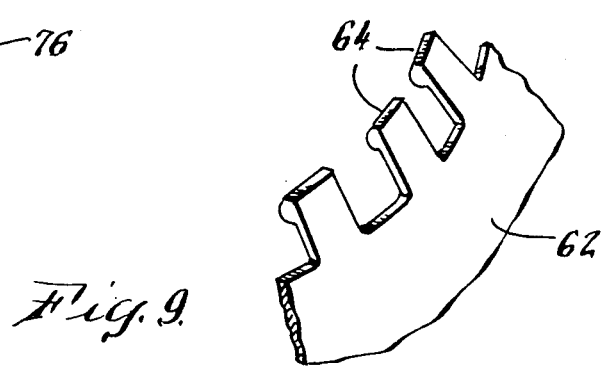

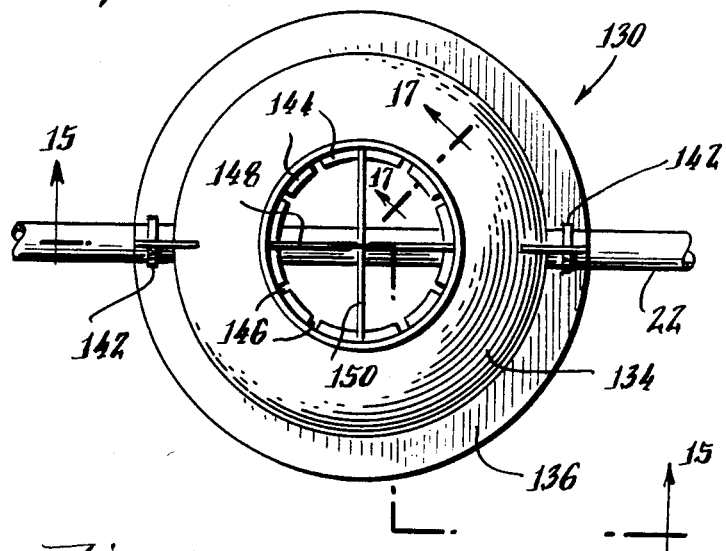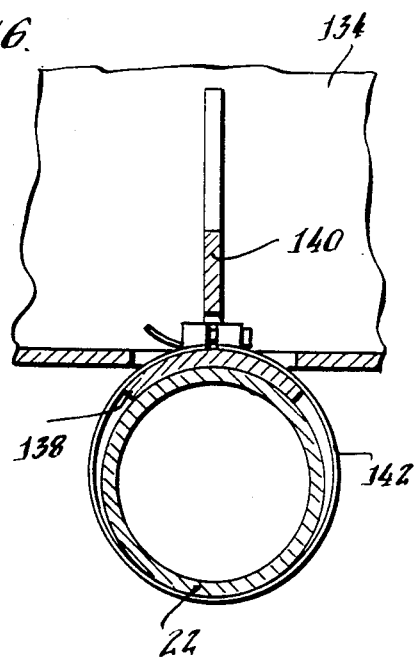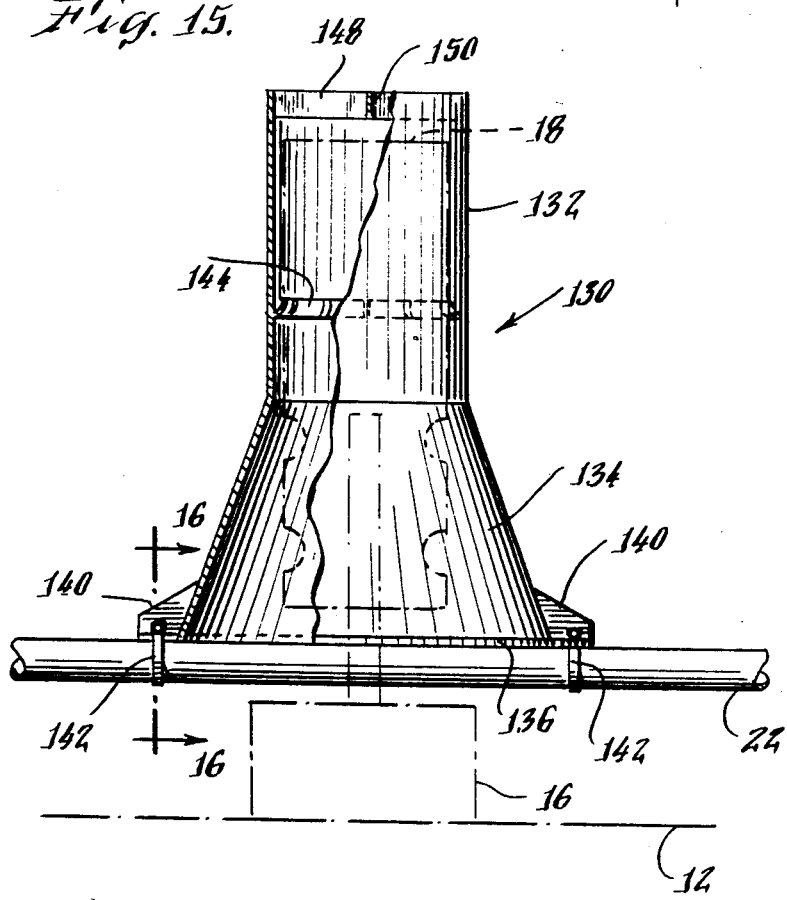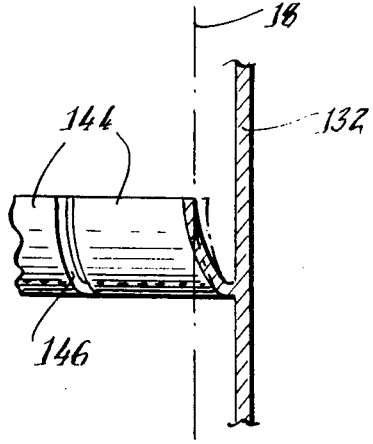

ADAPTER SKIRT FOR STATIC AERATOR MIXER

This is a continuation of application Ser. No. 215,030, filed Dec. 10, 1980, abandoned.

BACKGROUND OF THE INVENTION

1. Field Of The Invention

This invention relates to apparatus for aerating sewage in sewage lagoons, ponds or basins.

2. Description Of The Prior Art

Biological breakdown of sewage is a well-known technique for de-toxifying effluent, and a number of different techniques have evolved for entraining gas such as oxygen within sewage fuild or sludge for fueling its biological breakdown. One of the techniques which is used for aeration is to bubble a gas such as oxygen or air into the sewage from submerged pipes, whereupon some entrainment will occur.

It has been found that the efficiency of aeration will increase with the maximization of the gas surface area in the sewage. The efficiency also increases by mixing. The former technique requires as large a number of bubbles as is possible, and the second depends on agitation of the sewage. Both techniques are sometimes effected by bubbling the gas upwardly through a submerged cylindrical container which has baffles strategically placed either partly across or spiralling in some manner therethrough. Examples of such submerged cylindrical containers, which are commonly referred to as static aerator mixers are shown in U.S. Pat. Nos. 4,138,335; 4,169,873; 3,968,086; 3,628,775; 3,672,647; and 4,187,263.

The intent of the structure is to cause upward movement of the sewage by the pressure of differential density of gas entrained sewage, and shearing of the gas bubbles upon frictional contact with the baffles. Some agitation of the surrounding sewage has been found to occur, but in the main an unsatisfactory efficiency has resulted.

It has been found that the mixing efficiency in the basin can be increased by extending the sphere of mixing influence of the static aerator mixer installed in the basin by use of an adapter skirt as disclosed in the present invention.

SUMMARY OF THE INVENTION

The sphere of mixing influence of a static aerator mixer installed in the bottom of a sewage basin can be extended by providing a skirt in surrounding relationship to the submerged, open-ended, cylindrical container or mixer and supporting the same on the bubble generator pipe beneath the mixer structure or directly on the floor of the basin. This not only can be utilized to widen the zone of influence of the static aerator mixer by providing for additional agitation and mixing radially outwardly from the cylindrical surface of the static aerator mixer, but the currents can be forced closer to the floor of the basin to entrain otherwise static sludge. Further, additional surface area upon which the gas-entrained sludge can impinge is provided to collide therewith causing the sludge to be more finely divided wherein it can be mixed more readily with incoming gas to increase aerobic action and efficiency.

The adapter skirt for the static aerator mixer of the present invention may take a variety of forms.

In one form, the skirt can consist of a cylindrical body adapted to be seated and supported on the bubble generator pipe. The cylindrical body has a central opening in a top wall thereof provided with a rubber hose thereabout to frictionally bear against the outer cylindrical wall or surface of the static aerator mixer, which is received therethrough.

A second design includes an open-ended frustoconical-shaped skirt provided with fingers along its upper edge surface for engagement with the cylindrical wall of the static aerator mixer. The skirt encloses the lower portion of the cylindrical mixer which is also received therethrough. The outer surface of the lower portion of the skirt includes a ledge. Mounted for vertical adjustment on the ledge are a plurality of support legs so that each skirt leg may be adjusted to reach the support floor of the basin when the skirt is installed, so that it fits properly on the bubble generator pipe, but yet is supported by additional support legs on the floor of the sludge basin.

Still another skirt design may be of the cylindrical type described above, but provided with adjustable legs as disclosed and illustrated in conjunction with the second design.

Finally, the skirt can include an upper, cylindrical portion and a lower, frusto-conical portion flaring outwardly away from the side wall of the cylindrical static aerator mixer which is completely enclosed therein. The lower frusto-conical portion is provided with a ledge having at spaced, diametrically opposed portions thereabout an arcuate flange seated on the bubble generator pipe. The flange, in conjunction with an upright support strut mounts a flexible band used to encircle the pipe to connect the skirt to the pipe. The upper, cylindrical portion of the skirt is also provided with interior, resilient, flexible fingers circumferentially spaced about the inner diameter thereof for engagement with the outer cylindrical surface of the static aerator mixer to enable the skirt to be maintained in a relative upright position with respect to the static aerator mixer.

BRIEF DESCRIPTION OF THE DRAWINGS

Further objects and advantages of the invention will become apparent from the following description and claims, and the accompanying drawings, wherein:

FIG. 3 is a perspective view of one form of adapter skirt of the present invention placed in surrounding relation to a static aerator mixer;

FIG. 4 is a top plan view of another form of adapter skirt of the present invention;

FIG. 5 is a side view in elevation of the adapter skirt of FIG. 4;

FIG. 6 is an enlarged, fragmentary, exploded perspective view of the lower lefthand corner of the adapter skirt of FIG. 5, illustrating the manner in which the support legs are secured to the body of the skirt;

FIG. 7 is an enlarged side view in elevation, with certain portions in section, of the central lower portion of the adapter skirt of FIG. 5, illustrating the manner of securing the skirt to a bubble generator pipe;

FIG. 8 is a cross-sectional view taken substantially along the plane indicated by line 8—8 of FIG. 7;

FIG. 9 is an enlarged fragmentary perspective view of a portion of the upper edge of the skirt of FIG. 5, illustrating means for gripping the outer cylindrical wall of a static aerator mixer;

FIG. 14 is a top plan view of yet another embodiment of adapter skirt;

FIG. 15 is a cross-sectional view taken substantially along the plane indicated by line 15—15 of FIG. 14; and FIG. 16 is a cross-sectional view taken substantially along the plane indicated by line 16—16 of FIG. 15; and FIG. 17 is a cross-sectional view taken substantially along the plane indicated by line 17—17 of FIG. 14.

DETAILED DESCRIPTION OF THE PREFERRED EMBODIMENT

Figure 1:
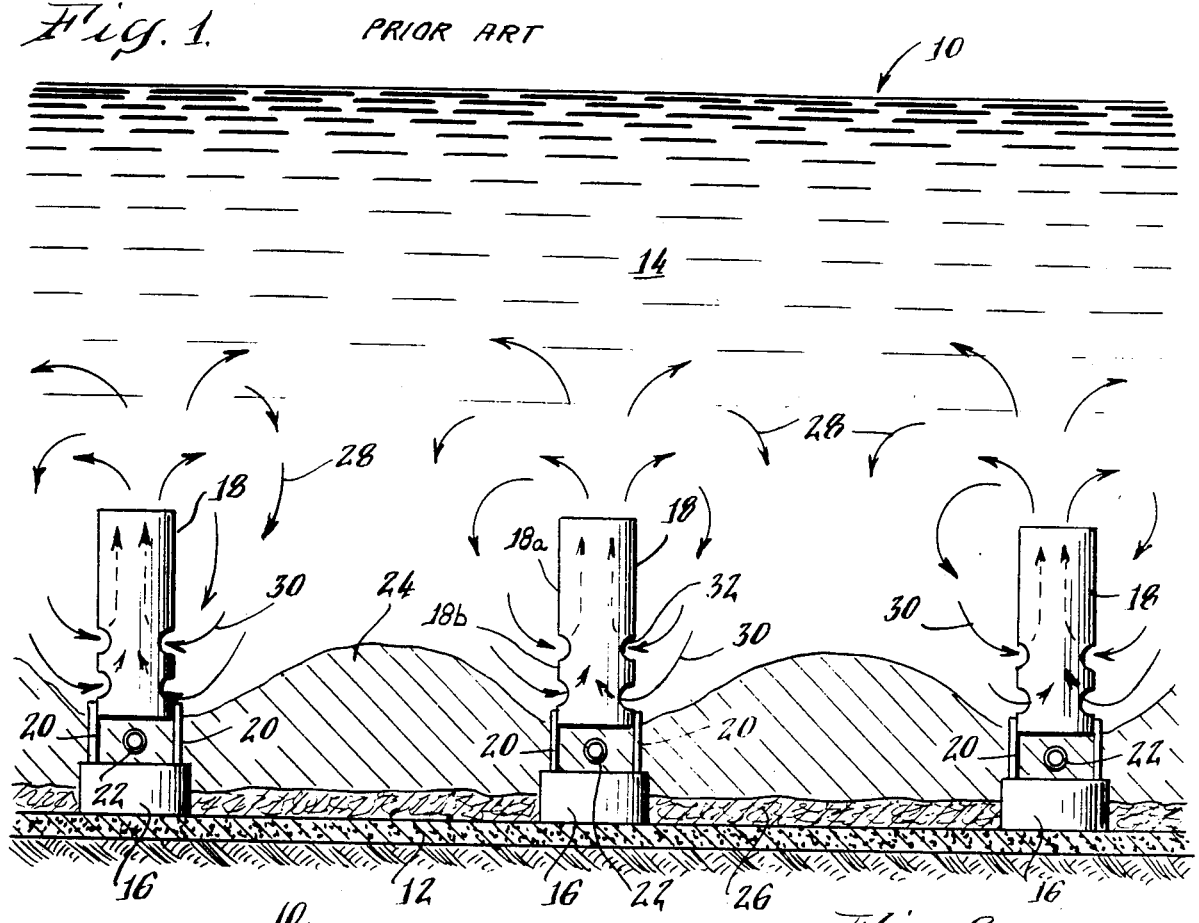
FIG. 1 is a schematic diagram of a prior art activated sludge basin.

Referring now in detail to the drawings, wherein like numerals indicate like elements throughout the several views, FIG. 1 schematically illustrates a prior art activated sludge basin 10 wherein sludge is mixed aerobically with oxygen in order to promote biological degradation of the sludge. The basin 10 includes a concrete floor 12 onto which a liquid effluent 14 containing sludge is deposited. The effluent 14 may typically consist of waste material from a paper mill.

Supported on concrete floor 12 at spaced locations are a plurality of concrete slabs 16 supporting an open-ended cylindrical, static aerator mixer 18 by spaced struts or legs 20 extending between the concrete slab and static mixer aerator 18. The static mixer aerator 18 includes a flue means portion 18a and an inner mixing chamber portion 18b. A cylindrical pipe 22 is disposed horizontally beneath each of the open-ended cylindrical mixers 18 and includes an opening beneath the mixer 18 through which a gas such as oxygen is bubbled. The bubbled oxygen entrains some of the light sludge 24 filtering from the effluent disposed upon a denser layer of heavy sludge 26 lining the concrete bottom floor 12 and moves the entrained sludge upwardly through the interior of the mixer 18 to promote mixing of the gas with the sludge.

The gas-entrained sludge, being lighter than the sludge alone, will rise through the interior of the mixer 18, which can be equipped with baffles as indicated in any of the aforementioned patents cited above, to further break up the entrained sludge into finer particles and promote the aerobic mixing. The entrained sludge will rise through the top open end of the static aerator mixer and will ultimately fall as indicated by the mixing current arrows 28 and be recirculated through the interior of the mixers 18 as indicated by the arrows 30. The mixers 18 are usually provided with openings 32 in the side walls thereof to accommodate the returning gas-entrained sludge.

It has been found that mixing efficiency and aerobic activity can be increased by extending the sphere of influence of the static aerator mixers 18. This is accomplished by surrounding at least a portion of each of the cylindrical static aerator mixers 18 with a skirt 33 (see FIG. 2) which extends downwardly beyond the bottom of the mixer and radially outwardly beyond the cylindrical side wall thereof to cause the mixing currents to occupy a greater lateral zone through which they move as well as causing them to approach the floor 12 of the basin 10 as illustrated more clearly in FIG. 2. Indeed, the mixing currents from adjacent mixer structures 18 may overlap as indicated at 35 to cause turbulent mixing. This increased mixing influence improves aerobic efficiency, as more sludge is dissolved in the effluent and subjected to aerobic de-toxification.

Figure 10:
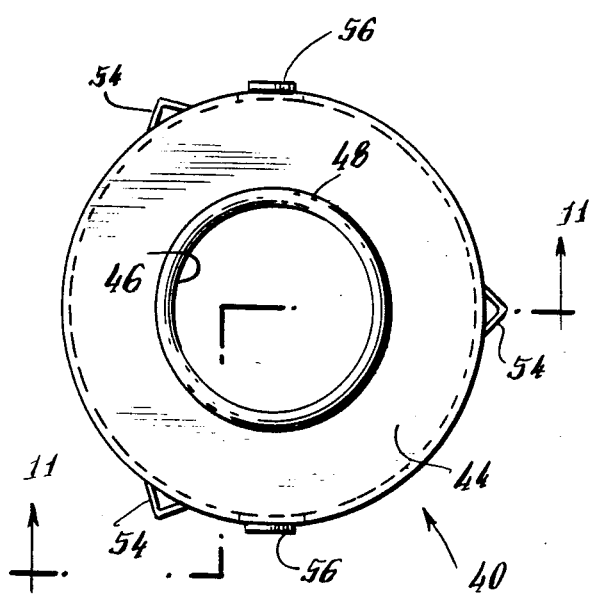
FIG. 10 is a top plan view of still another embodiment of adapter skirt.
Figure 11:
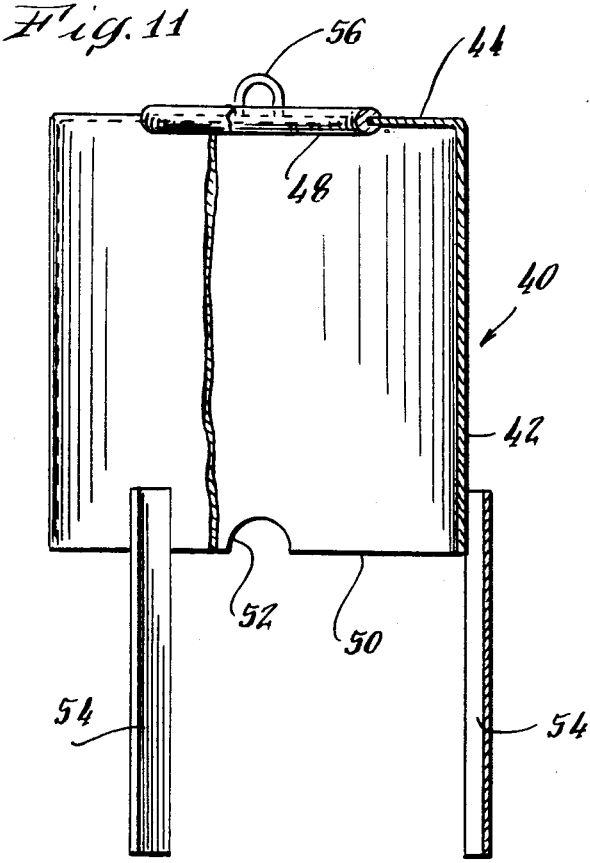
FIG. 11 is a cross-sectional view taken substantially along the planes indicated by line 11—11 of FIG. 10.

One specific form of aerator skirt is generally designated by numeral 40 and it is illustrated in FIGS. 3, 10 and 11. The skirt 40 includes a cylindrical body 42 provided with an annular top member 44 having an opening 46 disposed centrally therethrough. A split rubber hose collar 48 is secured to the inner lip of top 44 between the top 44 and opening 46. Collar 48 extends about the entire periphery of the inner lip of the top 44. Opening 46 is adapted to receive therethrough one of the static aerator mixers 18 (FIG. 3) in frictional engagement with rubber hose collar 48, which tends to locate the cylindrical body 42 and maintain it in an upright position relative to the static aerator mixer 18. Body 42 widens the zone of influence of mixer 18 and moves the zone closer to floor 12 of basin 10.

Figure 2:
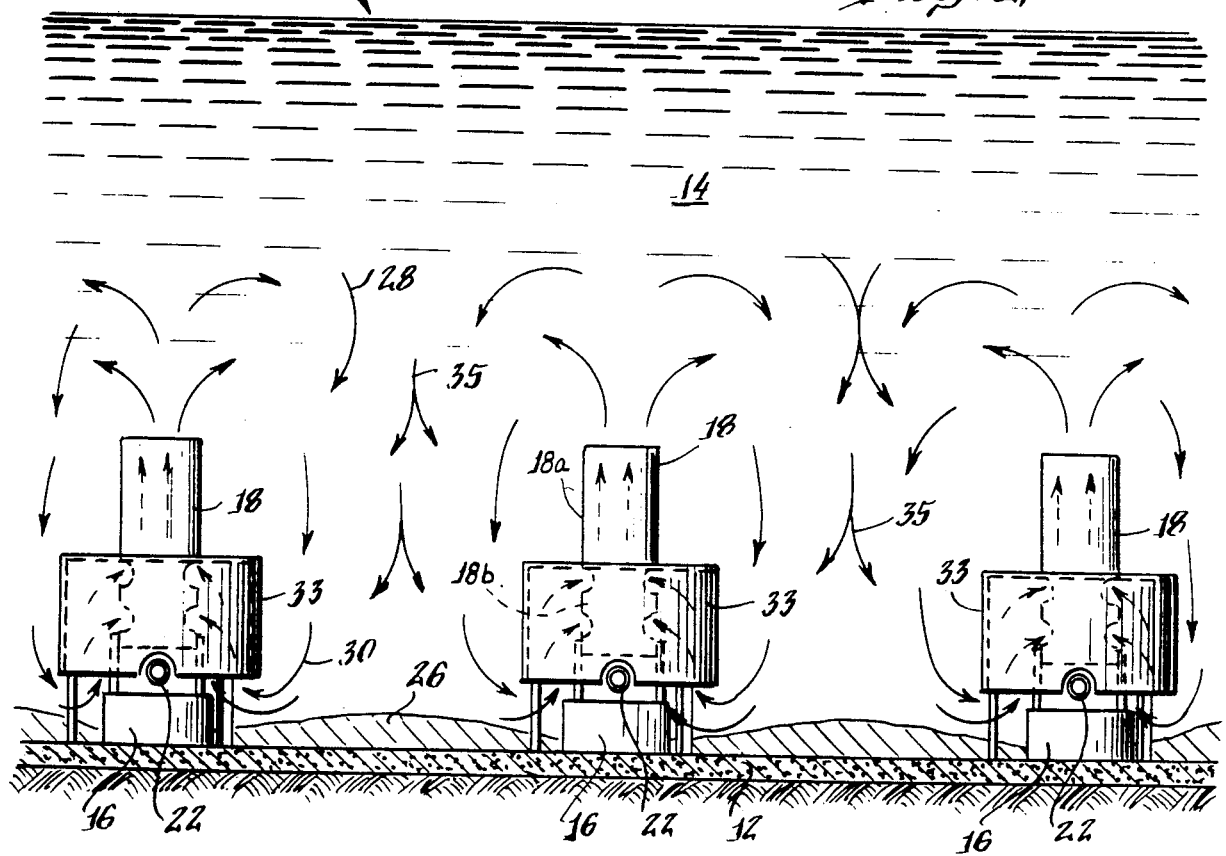
FIG. 2 is a schematic diagram of an activated sludge basin in which adapter skirts comprising the subject of the present invention have been installed on each of the static aerator mixers in the basin.

The bottom edge or rim 50 of the cylindrical body 42 of aerator skirt 40 is provided with a pair of semi-circular notches 52 which serve to seat the cylindrical body 42 on a bubble generator pipe 22 associated with the static aerator mixer 18 received through opening 46. The seating of the notches on pipe 22 causes the pipe to support the cylindrical body 42 in a position surrounding the lower portion of static aerator mixer 18 adjacent to the bottom of sludge basin 10, as illustrated in FIG. 2.

A plurality of legs 54 formed from angle irons are secured to spaced locations about the periphery of cylindrical body 42 of the skirt 40 to further support the same on the concrete bottom floor 12 of basin 10. Lifting lugs 56 are provided at diametrically opposed portions of cylindrical body 42 of skirt 40 in order to lift the skirt when it is necessary to remove the same for maintenance and to lower it into surrounding relation to the static aerator mixer 18.

A second embodiment of the adapter skirt is designated in general by the numeral 60 in FIGS. 4 to 9, inclusive. The skirt 60 includes a frusto-conical body 62 having a wider bottom than top and open at its opposed ends. The skirt 60 is also placed about the bottom portion of a static aerator mixer 18 and includes a plurality of serrations 64 extending about the periphery of its upper edge. The serrated edge is placed in engagement with the outer cylindrical surface of a static aerator mixer 18 (not shown) and frictionally maintains the skirt in an upright relation relative to the outer surface of the mixer.

An annular ledge 66 circumscribed the lower portion of the frusto-conical body 62 of skirt 60. A semi-circular flange 70 extends downwardly from opposed diametrical portions of annular ledge 66 in facing relation to an opening 68 extending from the bottom edge of frusto-conical body 62 towards flange 70. The frusto-conical body 62 of skirt 60 is positioned on a bubble generator pipe 22 by disposing the pipe through slots 68 into seated engagement with opposed flanges or flange seats 70. A coil spring 72 connected to eye bolts 74 threadedly connected to spaced portions of annular ledge 66 adjacent to each opening 68 is wrapped about the bottom arcuate portion of bubble generator pipe 22 to firmly secure frusto-conical portion 62 of the skirt 60 in spaced relation to the lower portion of the static aerator mixer 18. The flared nature of the frusto-conical portion 62 extends the zone of mixing influence of the static aerator mixer 18 both radially and vertically towards the bottom of the sludge basin 10.

Support legs 76 are connected to annular ledge 66 to provide additional support for the skirt 60 on the floor 12 of the sludge basin 10. The legs 76 provided at spaced locations about the periphery of ledge 66 are illustrated in detail in FIG. 6, and are adjustable.

Each of the legs 76 includes a substantially rectangular bar provided with an elongated slot 78 therethrough. Bar 76 is received within a groove 80 and is relatively, vertically adjustable therein. Groove 80 is formed in the outer face of a housing member 82 extending vertically along spaced peripheral portions of ledge 66. Housing 82 has a hollow interior extending along the angular lower inner surface of frusto-conical body 62 of skirt 60. Accordingly, a wedge member 84, complemental in shape to the interior portion of housing 82 is provided so that when wedge 84 is inserted therein a vertical bearing surface 86 parallel to bar 76 is provided. A bolt 88 having a head 90 at one end is inserted through aligned openings 92 and 94 on the wedge member 84 and housing 82, respectively, and inserted within elongated slot 78 on bar leg member 76. A washer 95 and a nut 96 threaded on the opposite end of bolt 88 is utilized to lock the bar leg 76 in adjusted relative vertical relation to the frusto-conical body portion 62 of skirt 60 so as to rest on the floor of the basin 10 for support purposes. Otherwise, when installed, the legs 76 would have to be shortened or possibly lengthened depending on the particular installation. By virtue of the adjustability of the legs 76, the skirt 60 can have substantially universal application.

Figure 12:
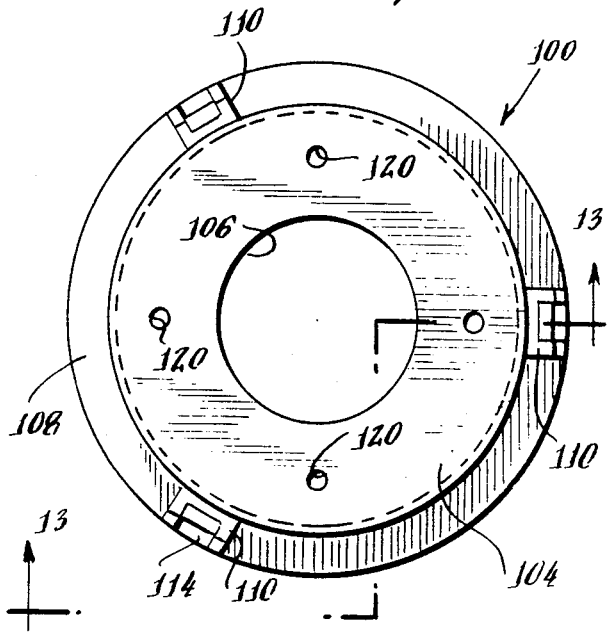
FIG. 12 is a top plan view of the embodiment of adapter skirt illustrated in FIG. 3.
Figure 13:
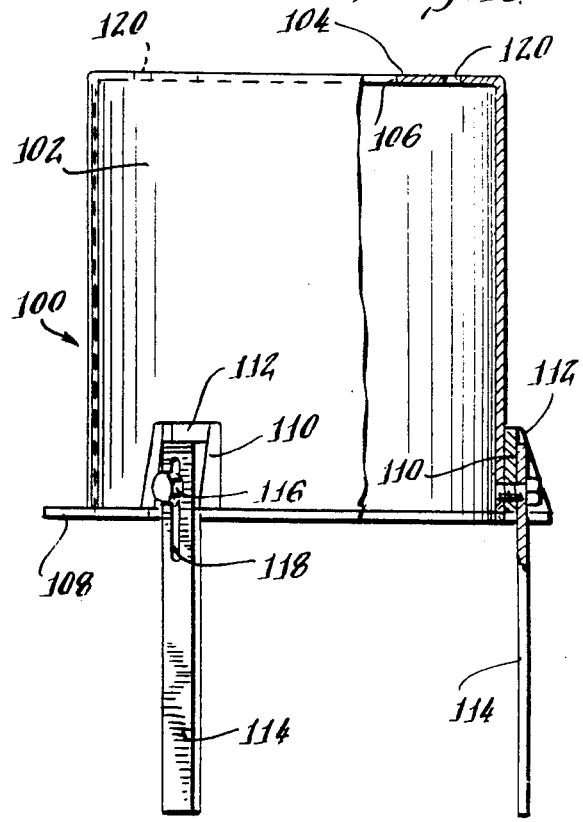
FIG. 13 is a cross-sectional view taken substantially along the planes indicated by line 13—13 of FIG. 12.

FIGS. 12 and 13 illustrate yet another adapter skirt 100. The skirt 100 is simular to the aerator skirt 40 in that it includes a cylindrical body element 102. The body element 102 includes a top plate 104 having a centrally located opening 106 therethrough for receiving one of the static aerator mixers 18.

Additionally, the bottom lip of the cylindrical body structure 102 includes an annular ledge 108 having a plurality of housings 110 mounted about its periphery, each of which includes a groove 112 for slidably receiving in adjustable relation a bar leg 114. A bolt 116 is received through housing 110 and received in an elongated slot 118 in bar leg 114 so that the leg can be adjusted vertically with respect to cylindrical body structure 102. In this embodiment, the skirt adapter 100 can be supported directly upon the concrete floor 12 of the sludge basin 10 rather than on the bubble generator pipe 22. Further, a plurality of openings 120 can be provided in annular top plate 104 to receive hooks or ropes for lifting the skirt so that it can be removed for maintenance and put into position about a static aerator mixer 18.

Another embodiment of a skirt adapter is illustrated in FIGS. 14 to 17, inclusive, generally by the numeral 130. The adapter 130 includes an upper cylindrical body portion 132 joined to a flared outwardly, frusto-conical portion 134. An annular ledge 135 is connected to the lower edge of the frusto-conical body portion 134 of skirt 130. Diametrically opposed portions of ledge 136 include a downwardly bent arcuate seat 138 braced by a strut 140 (see FIG. 16) extending between the outer surface of the frusto-conical body portion 134 and annular ledge 136. A band or strap 142 is received about the upper surface of seat 138 and extends through strut 140.

The skirt 130 can be placed about static aerator mixer 18 with the seats 138 encompassing the outer dimension of the bubble generator pipe 22 as illustrated in FIGS. 15 and 16. Straps 142 are then used to connect the skirt 130 to the pipe 22 to support the same about the static aerator mixer 18.

Approximately two-thirds of the way from the top of the cylindrical portion 132 of the body structure of the skirt 130 is an interior set of resilient fingers 144 formed by an annular upright plate having a plurality of slots 146 between each pair of fingers 144 (see FIG. 17). The fingers are resilient and are adapted to be deflected and contact the side wall of the cylindrical static aerator mixer 18 to right the adapter skirt 130 when supported upon pipe 22 and frictionally grab the side wall of the static aerator mixer 18. The upper opening of the cylindrical portion 132 of the skirt 130 includes a pair of cross-members 148 and 150.

By virtue of the flared, lower frusto-conical portion 134, the sphere of mixing influence of the static aerator mixer 18 is extended both radially and vertically, as in the other embodiments of aerator skirts. The skirt 130 is self-supporting without the use of additional leg supports reaching the floor 12 of the sludge basin 10.

What is claimed as new is as follows:

1. For use in an activated sludge basin having at least a horizontally disposed bottom surface, said sludge basin for mixing sludge with an oxygen containing gas, an oxygen-containing gas supply means,
   an inner mixing chamber,
   vertically-extending flue means having a side wall with openings therein, said flue means in communication with said inner mixing chamber including an annular side wall and an open top end, said inner mixing chamber and flue means disposed above said gas supply means and spaced from said sludge basin bottom surface by support means for causing gas from said gas supply means to flow vertically through said inner mixing chamber and into said flue means urging said sludge from said sludge basin into said inner mixing chamber and said flue means through the bottom end thereof, mixing with said sludge and directing said sludge vertically therethrough toward the top end of said flue means, and
   a skirt disposed about and secured to said flue means, said skirt including:
   a body element having an outer wall and upper and lower ends, the upper end of said body element including means for frictionally engaging said side wall of said flue means above its side wall openings, said body element extending concentrically outward from said flue means such that the radial distance from the center of said flue means to its annular wall is substantially less than the radial distance from the center of said flue means to the skirt body element outer wall, and
   means connected to said body element for supporting said body element relative to the bottom surface of said sludge basin, the distance from the sludge basin bottom to the lower end of the body element being less than the distance from the sludge basin bottom to the bottom end of said mixing chamber, whereby said skirt is operative to enlarge the area of said sludge basin from which said gas urges said sludge for mixing in said inner mixing chamber and said flue means.

2. Apparatus as in claim 1 wherein said support means includes
means for supporting said body element on the bottom of said sludge basin.

3. Apparatus as in claim 2 wherein said means for supporting said body element on the bottom of said basin floor includes a plurality of legs fixed to said body element at spaced locations thereabout and extending downwardly therefrom.

4. Apparatus as in claim 3 wherein said support legs are vertically adjustable relative to said body element.

5. Apparatus as in claim 1 wherein said support means includes
means for supporting said body element on said gas supply means.

6. Apparatus as in claim 5 wherein said support means includes
a flange seat on diametrically opposed portions of said body element and a slot in diametrically opposed portions of said body element beneath each of said flange seats.

7. Apparatus in accordance with claim 6 wherein said flange seat includes an arcuate surface.

8. Apparatus in accordance with claim 7 including holding means cooperating with said arcuate surface on said flange seat for connecting said flange seat to said gas supply means.

9. Apparatus in accordance with claim 8 wherein said holding means includes
a coil spring wrapped about said gas supply means.

10. Apparatus in accordance with claim 15 wherein said holding means includes
a strap wrapped about said gas supply means.

11. Apparatus in accordance with claim 1 wherein said body element is frusto-conical in shape.

12. Apparatus in accordance with claim 1 wherein said body element is substantially cylindrical in shape.

13. Apparatus in accordance with claim 1 wherein said body element has an upper cylindrical portion and a lower frusto-conical portion.

14. Apparatus in accordance with claim 1 wherein said frictional engagement means includes a split annular rubber hose disposed surrounding an annular edge of an opening in a top wall of said body element.

15. Apparatus in accordance with claim 1 wherein said frictional engagement means includes
an upper serrated edge on said body element.

16. Apparatus in accordance with claim 1 wherein said frictional engagement means includes
a plurality of resilient fingers arranged in an annular array within the interior of said body element.

* * * * *